US010161360B2

(12) United States Patent
Ninomiya et al.

(10) Patent No.: US 10,161,360 B2
(45) Date of Patent: Dec. 25, 2018

(54) VALVE DEVICE

(71) Applicant: KAWASAKI JUKOGYO KABUSHIKI KAISHA, Kobe-shi, Hyogo (JP)

(72) Inventors: Makoto Ninomiya, Kobe (JP); Masayoshi Okamoto, Kakogawa (JP); Katsu Yoshida, Kakogawa (JP); Yoshiteru Fujimoto, Akasi (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/551,297

(22) PCT Filed: Feb. 23, 2016

(86) PCT No.: PCT/JP2016/000955
§ 371 (c)(1),
(2) Date: Aug. 16, 2017

(87) PCT Pub. No.: WO2016/136239
PCT Pub. Date: Sep. 1, 2016

(65) Prior Publication Data
US 2018/0038507 A1  Feb. 8, 2018

(30) Foreign Application Priority Data

Feb. 26, 2015  (JP) ................. 2015-036636

(51) Int. Cl.
*F16K 31/42* (2006.01)
*F02M 21/02* (2006.01)
(Continued)

(52) U.S. Cl.
CPC ..... *F02M 21/0233* (2013.01); *F16K 31/0655* (2013.01); *F16K 31/42* (2013.01); *F17C 13/00* (2013.01)

(58) Field of Classification Search
CPC . F02M 21/0233; F16K 31/0655; F16K 31/42; F17C 13/00
See application file for complete search history.

(56) References Cited

U.S. PATENT DOCUMENTS 2,575,272 A * 11/1951 Harris ............... F16K 31/408
                                                    137/629
4,699,351 A * 10/1987 Wells ............... F16K 31/408
                                                    251/29
(Continued)

FOREIGN PATENT DOCUMENTS

JP       S61-85775 U    6/1986
JP       S63-58312 B2   11/1988
(Continued)

OTHER PUBLICATIONS

May 24, 2016 International Search Report issued in International Patent Application No. PCT/JP2016/000955.
(Continued)

*Primary Examiner* — Eric Keasel
(74) *Attorney, Agent, or Firm* — Oliff PLC

(57) ABSTRACT

A valve device includes: a main valve element dividing a valve element space of a housing into first and second pressure chambers; a sealing member configured to isolate the first and second pressure chambers from each other; a first pilot passage including one end communicating with a primary passage, the other end communicating with the second pressure chamber, and a first restrictor; a second pilot passage including a second restrictor and formed at the main valve element; a pilot valve element configured to open and close the second pilot passage; a drive mechanism configured to, when a current flows through the drive mechanism, drive the pilot valve element such that the pilot valve element opens the second pilot passage against biasing force
(Continued)

of a biasing member; and a pin coupling the main valve element and the pilot valve element to each other.

9 Claims, 9 Drawing Sheets

(51) Int. Cl.
    *F17C 13/00*     (2006.01)
    *F16K 31/06*     (2006.01)

(56) References Cited

U.S. PATENT DOCUMENTS

| | | | | |
|---|---|---|---|---|
| 4,938,450 | A * | 7/1990 | Tripp | F16K 47/08 137/625.3 |
| 5,048,790 | A * | 9/1991 | Wells | F16K 31/408 251/30.04 |
| 5,271,599 | A * | 12/1993 | Kolchinsky | F16K 31/408 251/30.01 |
| 6,520,206 | B2 * | 2/2003 | Hotta | F16K 1/443 137/613 |
| 7,730,905 | B2 * | 6/2010 | Suzuki | F17C 13/04 137/613 |
| 2004/0045539 | A1 * | 3/2004 | Furuta | F16K 31/0679 123/529 |
| 2011/0068286 | A1 * | 3/2011 | Nomichi | F16K 31/0655 251/129.15 |

FOREIGN PATENT DOCUMENTS

| | | |
|---|---|---|
| JP | H08-75029 A | 3/1996 |
| JP | 2002-071044 A | 3/2002 |
| WO | 2015/033528 A1 | 3/2015 |

OTHER PUBLICATIONS

Aug. 29, 2017 International Preliminary Report on Patentability issued in International Patent Application No. PCT/JP2016/000955.

* cited by examiner

VALVE DEVICE

TECHNICAL FIELD

The present invention relates to a valve device used as, for example, a pneumatic controller or a stopper for a gas tank.

BACKGROUND ART

For example, known as a valve device that operates under a high-pressure condition is a device including: a main valve element that blocks and opens a main passage formed at a housing; and a pilot valve element that controls opening/closing operations of the main valve element. For example, PTL 1 discloses a valve device in which a main valve element and a pilot valve element are arranged coaxially.

FIG. 10 shows a part of a valve device 100 disclosed in PTL 1. A primary passage 121, a pressure chamber 122, and a secondary passage 123 are formed at a housing 110 of the valve device 100. The primary passage 121, the pressure chamber 122, and the secondary passage 123 constitute a main passage 120. The secondary passage 123 is opened and closed by a main valve element 140. A pilot chamber 130 is formed on an opposite side of the pressure chamber 122 across the main valve element 140. The pilot chamber 130 communicates with the pressure chamber 122 through a first pilot passage 131 that is a gap between the main valve element 140 and the housing 110. A second pilot passage 132 is formed at the main valve element 140 and is opened and closed by a pilot valve element 150. The pilot valve element 150 is driven by a solenoid (not shown).

Further, in the valve device 100, the main valve element 140 and the pilot valve element 150 are coupled to each other by a pin 160. The pin 160 is fitted in a transverse hole of the pilot valve element 150 without any gap. However, a gap is formed between the pin 160 and a support hole 141 of the main valve element 140, and therefore, the pilot valve element 150 can be separated from the main valve element 140 by the gap.

The pilot valve element 150 is pressed against the main valve element 140 by a spring (not shown). When a current flows through the solenoid (not shown), the pilot valve element 150 is first separated from the main valve element 140 by the gap between the support hole 141 and the pin 160. Thus, the second pilot passage 132 is opened. Then, when differential pressure between the pilot chamber 130 and the secondary passage 123 becomes low, and attractive force of the solenoid attracting the pilot valve element 150 exceeds biasing force of the spring biasing the pilot valve element 150 and pressure of the pilot chamber 130, the main valve element 140 is pulled upward. Thus, the secondary passage 123 is opened.

CITATION LIST

Patent Literature

PTL 1: Japanese Laid-Open Patent Application Publication No. 8-75029

SUMMARY OF INVENTION

Technical Problem

However, according to a configuration in which the main valve element 140 is driven in an open direction by the attractive force of the solenoid as in the valve device 100 disclosed in PTL 1, some amount of time is required until the attractive force of the solenoid exceeds the biasing force of the spring biasing the pilot valve element 150 and the pressure of the pilot chamber 130. Thus, responsiveness of the above configuration is not good. Further, since the solenoid has to have high attractive force for pulling up the main valve element 140, it is difficult to reduce the size of the solenoid.

An object of the present invention is to provide a valve device in which a drive mechanism for a pilot valve element can be reduced in size and which has excellent responsiveness.

Solution to Problem

To solve the above problems, a valve device of the present invention includes: a housing including a primary passage, a secondary passage, and a valve element space between the primary passage and the secondary passage, the primary passage and the secondary passage constituting a main passage; a main valve element provided in the housing so as to divide the valve element space into a first pressure chamber and a second pressure chamber, the main valve element being configured to open and close the secondary passage, the first pressure chamber communicating with the primary passage and the secondary passage; a sealing member provided in an annular groove and configured to isolate the first pressure chamber and the second pressure chamber from each other, the annular groove being provided on the main valve element and covered with the housing; a first pilot passage including one end directly or indirectly communicating with the primary passage, the other end communicating with the second pressure chamber, and a first restrictor; a second pilot passage including a second restrictor and formed at the main valve element so as to extend from the second pressure chamber to the secondary passage; a pilot valve element provided in the second pressure chamber and configured to open and close the second pilot passage; a biasing member configured to press the pilot valve element against the main valve element; a drive mechanism configured to, when a current flows through the drive mechanism, drive the pilot valve element such that the pilot valve element opens the second pilot passage against biasing force of the biasing member; and a pin coupling the main valve element and the pilot valve element to each other, a gap which allows the pilot valve element to be separated from the main valve element being formed between the pin and the main valve element or between the pin and the pilot valve element, wherein: when the second pilot passage is opened by the pilot valve element, and pressure of the second pressure chamber becomes lower than pressure of the first pressure chamber, the main valve element is driven so as to open the secondary passage by differential pressure between the first pressure chamber and the second pressure chamber; and the sealing member includes a spiral ring configured to slide on the housing.

According to the above configuration, the main valve element is driven in an open direction by the differential pressure between the first pressure chamber and the second pressure chamber. Therefore, when the second pilot passage is opened by the pilot valve element, the main valve element instantly performs an open operation by a decrease in pressure of the second pressure chamber. On this account, the valve device has excellent responsiveness. In addition, the drive mechanism for the pilot valve element is only required to have power necessary to drive the pilot valve element by the gap between the pin and the main valve element or between the pin and the pilot valve element. Therefore, the drive mechanism can be reduced in size. Further, since the second pilot passage including the second restrictor is formed at the main valve element, an area of the valve seat for the pilot valve element can be reduced, and the open operation of the pilot valve element can be performed by smaller driving power. Furthermore, since the main valve element and the pilot valve element are coupled to each other by the pin, the open state of the secondary passage by the main valve element can be maintained by utilizing the power of the drive mechanism.

As the sealing member attached to the main valve element, it is possible to use a sealing member including: a bias cut type flat ring configured to slide on the housing and having an oblique cut so as to be expandable when the flat ring is attached; and an elastic body configured to bias the flat ring in a radially outward direction. However, in this case, to stably generate differential pressure between the first pressure chamber and the second pressure chamber, the size of the cut of the flat ring after the flat ring is attached needs to be managed strictly. On the other hand, according to the sealing member including the spiral ring as in the present invention, a length of an overlap where a part of the circling portion and another part of the circling portion overlap each other is relatively long. Therefore, adequate seal performance can be secured without strictly managing a gap between parts of the circling portion. On this account, unlike the flat ring, the management of the size of the cut of the flat ring after the flat ring is attached is unnecessary, and the manufacturing cost can be reduced.

The valve device may be configured such that: the spiral ring is formed by winding a single wire material such that at least both end portions of the wire material overlap a circling portion of the wire material; and each of the end portions of the wire material tapers such that a wedge-shaped gap is formed between the circling portion and the end portion. According to this configuration, when fitting the spiral ring into the annular groove of the main valve element, the circling portion can be smoothly deformed between the end portions of the wire material along the shapes of the end portions, and the spiral ring can be easily made flat.

For example, the valve device may be configured such that the sealing member includes an elastic body configured to bias the spiral ring in a radially outward direction.

Instead of the spiral ring, a flat ring may be used, which is configured to slide on the housing and is also configured such that both end portions, overlapping each other, of a wire material extending in a circumferential direction of the flat ring has such step shapes as to be in surface contact with each other on a plane orthogonal to an axial direction of the flat ring. This configuration can also obtain the same effects as the above case where the spiral ring is used. For example, the sealing member may include an elastic body configured to bias the flat ring in the radially outward direction.

The valve device may be configured such that: the drive mechanism is a solenoid including a fixed magnetic pole configured to attract the pilot valve element; the housing is provided with a stopper for the main valve element; and when the second pilot passage and the secondary passage are closed, a distance from the pilot valve element to the fixed magnetic pole is longer than a sum of a distance from the main valve element to the stopper and the gap. According to this configuration, while a current flows through the solenoid, the main valve element can be pressed against the stopper by attractive force of the solenoid.

The valve device may be configured such that the first pilot passage is formed at the housing or the main valve element. According to this configuration, the first restrictor can be formed by machine work with a high degree of accuracy.

Advantageous Effects of Invention

The present invention can provide a valve device in which a drive mechanism for a pilot valve element can be reduced in size and which has excellent responsiveness.

DESCRIPTION OF EMBODIMENTS

Embodiment 1

Figure 1:
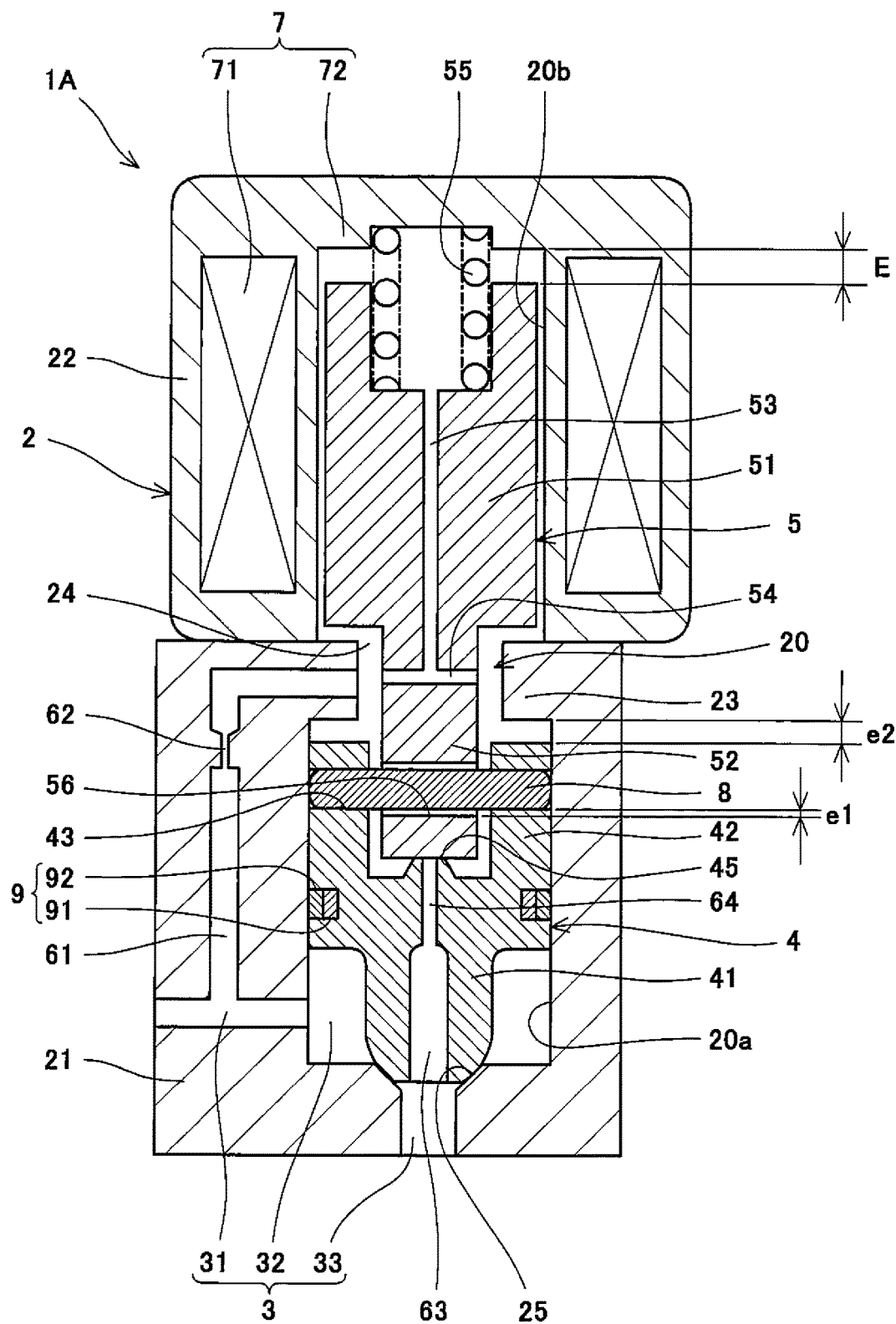
FIG. 1 is a schematic configuration diagram of a valve device according to Embodiment 1 of the present invention and shows a state where a main passage is blocked by a main valve element.
Figure 2:
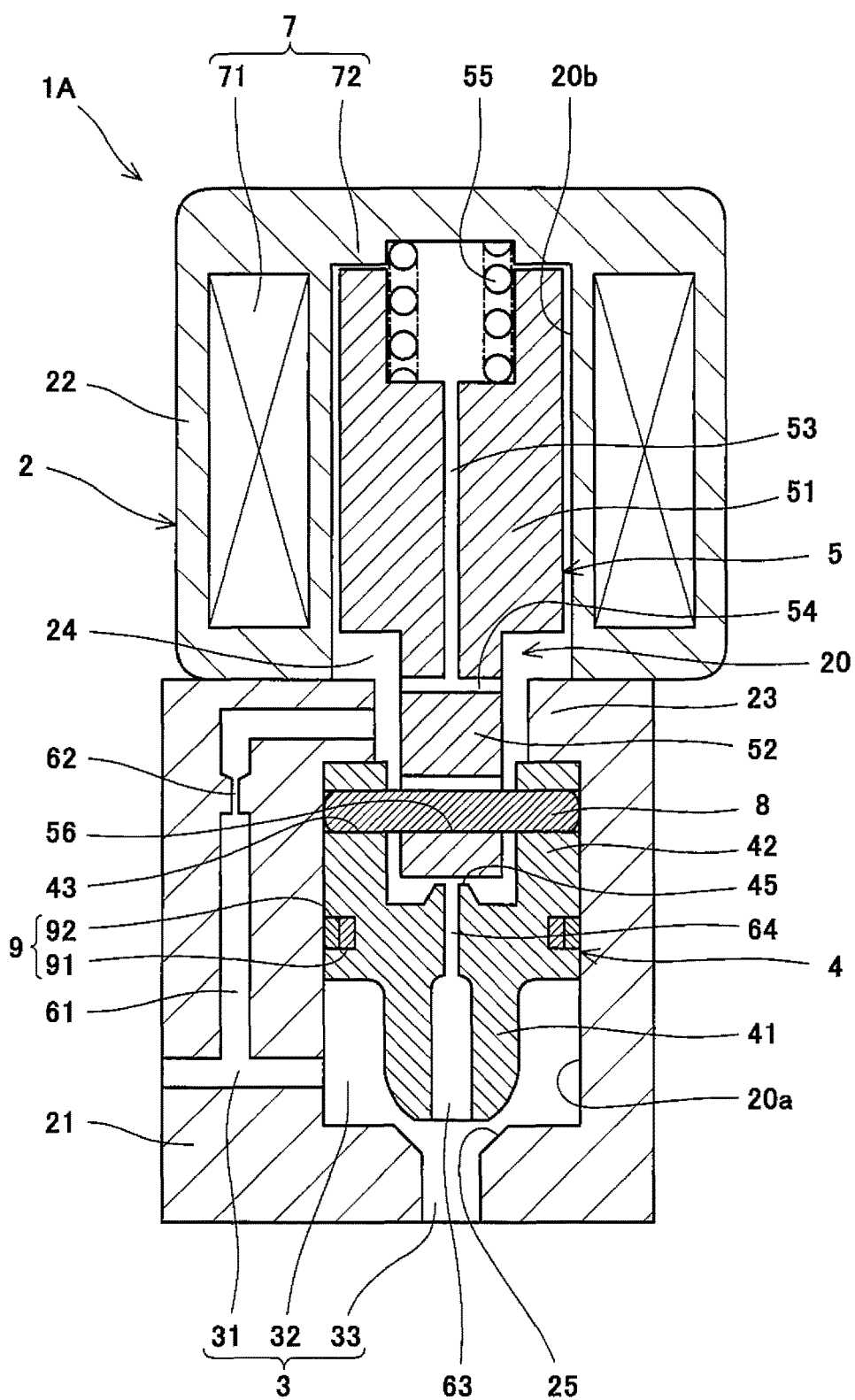
FIG. 2 shows a state where the main passage is opened by the main valve element in the valve device of Embodiment 1.

FIGS. 1 and 2 show a valve device 1A according to Embodiment 1 of the present invention. The valve device 1A is used as a pneumatic controller, a stopper for a gas tank, or the like. A fluid intended for the valve device 1A is, for example, a high-pressure gas.

The valve device 1A of the present embodiment is a solenoid valve. Specifically, the valve device 1A includes a housing 2, a main valve element 4 and pilot valve element 5 provided in the housing 2, and a solenoid (drive mechanism) 7 configured to drive the pilot valve element 5. When the valve device 1A is used as the stopper for the gas tank, almost whole of the valve device 1A including the solenoid 7 may be inserted in the gas tank.

However, the valve device 1A is not limited to the solenoid valve adopting the solenoid 7 as the drive mechanism. For example, a piezoelectric actuator may be used as the drive mechanism. The piezoelectric actuator includes a piezoelectric element (piezo element) and generates driving force corresponding to an applied voltage. Or, a force motor may be used as the drive mechanism. The force motor is configured such that a movable coil is inserted into a cylindrical permanent magnet. When a current flows through the movable coil, magnetizing force corresponding to the current is generated, and the movable coil moves by this magnetizing force.

Each of the main valve element 4 and the pilot valve element 5 is a rod-shaped member having a circular cross section. A central axis of the main valve element 4 and a central axis of the pilot valve element 5 are located on the same straight line. In other words, the main valve element 4 and the pilot valve element 5 are coaxially provided. Hereinafter, for convenience of explanation, a direction in which the main valve element 4 and the pilot valve element 5 are lined up (i.e., an axial direction of each of the main valve element 4 and the pilot valve element 5) is referred to as an upward/downward direction (the pilot valve element 5 side is an upper side, the main valve element 4 side is a lower side). However, needless to say, the direction in which the main valve element 4 and the pilot valve element 5 are lined up may be a horizontal direction or an oblique direction.

The housing 2 includes a first main body 21 and a second main body 22. A primary passage 31 and a secondary passage 33 are formed at the first main body 21 and constitute a main passage 3, and the solenoid 7 is incorporated in the second main body 22. The housing 2 further includes a valve element space 20 between the primary passage 31 and the secondary passage 33. The valve element space 20 extends in both the first main body 21 and the second main body 22.

More specifically, the first main body 21 includes a cylindrical first sliding chamber 20a which holds the main valve element 4 such that the main valve element 4 is slidable in the upward/downward direction. The second main body 22 includes a cylindrical second sliding chamber 20b which holds the pilot valve element 5 such that the pilot valve element 5 is slidable in the upward/downward direction. The first main body 21 includes a stopper 23 which is located between the first sliding chamber 20a and the second sliding chamber 20b, projects in a radially inward direction, and contacts the upwardly-moving main valve element 4 to stop the main valve element 4. The valve element space 20 is a continuous space defined by the first sliding chamber 20a, the stopper 23, and the second sliding chamber 20b.

One end (upstream end) of the primary passage 31 opens on a side surface of the first main body 21, and the other end (downstream end) of the primary passage 31 opens on a peripheral surface of the first sliding chamber 20a. One end (upstream end) of the secondary passage 33 opens on a bottom surface of the first sliding chamber 20a, and the other end (downstream end) of the secondary passage 33 opens on a lower surface of the first main body 21. A first valve seat 25 for the main valve element 4 is formed at the bottom surface of the first sliding chamber 20a so as to be located around the upstream end of the secondary passage 33.

The main valve element 4 is provided in the housing 2 so as to divide the valve element space 20 into a first pressure chamber 32 and a second pressure chamber 24. The first pressure chamber 32 communicates with the primary passage 31 and the secondary passage 33. The first pressure chamber 32 constitutes the main passage 3 together with the primary passage 31 and the secondary passage 33.

More specifically, the main valve element 4 includes a shaft portion 41 and a tubular portion 42. The shaft portion 41 is smaller in diameter than the peripheral surface of the first sliding chamber 20a. The tubular portion 42 extends upward from an upper peripheral portion of the shaft portion 41 and has an outer diameter substantially equal to the diameter of the peripheral surface of the first sliding chamber 20a. The tubular portion 42 is held by the first sliding chamber 20a so as to be slidable. To be specific, the first pressure chamber 32 is defined between an outer peripheral surface of the shaft portion 41 and a portion of the peripheral surface of the first sliding chamber 20a, the portion being located below the tubular portion 42. The second pressure chamber 24 is constituted by: a space facing an upper surface of the shaft portion 41 and an inner peripheral surface of the tubular portion 42; a region of the first sliding chamber 20a, the region being located above the main valve element 4; an inside of the stopper 23; and the second sliding chamber 20b.

A sealing member 9 configured to isolate the first pressure chamber 32 and the second pressure chamber 24 from each other is attached to the tubular portion 42 of the main valve element 4. Specifically, an annular groove is formed on an outer peripheral surface of the tubular portion 42. The annular groove is open in a radially outward direction and is covered with the peripheral surface of the first sliding chamber 20a. The sealing member 9 is provided in the annular groove. The sealing member 9 will be explained later in detail.

The main valve element 4 moves between a closed position where the shaft portion 41 is seated on the first valve seat 25 and an open position where the tubular portion 42 contacts the stopper 23. Thus, the main valve element 4 opens and closes the secondary passage 33. When the shaft portion 41 is seated on the first valve seat 25, the secondary passage 33 is closed, and the first pressure chamber 32 is isolated from the secondary passage 33. When the shaft portion 41 is separated from the first valve seat 25, the secondary passage 33 is opened, and the first pressure chamber 32 is connected to the secondary passage 33.

In the present embodiment, a first pilot passage 61 is formed at the first main body 21 of the housing 2. One end (upstream end) of the first pilot passage 61 directly communicates with the primary passage 31, and the other end (downstream end) of the first pilot passage 61 communicates with the second pressure chamber 24. A first restrictor 62 is provided at an intermediate portion of the first pilot passage 61.

A second pilot passage 63 is formed at the main valve element 4 so as to extend from the second pressure chamber 24 to the secondary passage 33. The second pilot passage 63 is located on the central axis of the main valve element 4. One end (upstream end) of the second pilot passage 63 opens on the upper surface of the shaft portion 41, and the other end (downstream end) of the second pilot passage 63 opens on a tip end surface of the shaft portion 41. A second restrictor 64 is provided at an end portion of the second pilot passage 63, the end portion being located at the second pressure chamber 24 side. The second pilot passage 63 is opened and closed by the pilot valve element 5.

The pilot valve element 5 is provided in the second pressure chamber 24. A biasing member 55 configured to press the pilot valve element 5 against the main valve element 4 is provided in the second pressure chamber 24. The biasing member 55 is, for example, a compression coil spring.

To prevent the second pressure chamber 24 from being completely separated into upper and lower spaces by the pilot valve element 5, the pilot valve element 5 includes a longitudinal hole 53 located on the central axis and a transverse hole 54 intersecting with a lower end of the longitudinal hole 53. In the second pressure chamber 24, a space at a lower side of the pilot valve element 5 and a space at an upper side of the pilot valve element 5 communicate with each other through the longitudinal hole 53 and the transverse hole 54.

More specifically, the pilot valve element 5 includes: a main body portion 51 held by the second sliding chamber 20b so as to be slidable; and a shaft portion 52 projecting downward from the main body portion 51 to be inserted into the tubular portion 42 of the main valve element 4.

A second valve seat 45 for the pilot valve element 5 is formed on the upper surface of the shaft portion 41 of the main valve element 4 so as to be located around the upstream end of the second pilot passage 63. When the shaft portion 52 is seated on the second valve seat 45, the second pilot passage 63 is closed, and the second pressure chamber 24 is isolated from the second pilot passage 63. When the shaft portion 52 is separated from the second valve seat 45, the second pilot passage 63 is opened, and the second pressure chamber 24 is connected to the second pilot passage 63. In the second pressure chamber 24, when the shaft portion 52 of the pilot valve element 5 is separated from the second valve seat 45, a fluid is introduced to the upstream end of the second pilot passage 63 through a gap between the inner peripheral surface of the tubular portion 42 of the main valve element 4 and an outer peripheral surface of the shaft portion 52 of the pilot valve element 5 and a gap between the upper surface of the shaft portion 41 of the main valve element 4 and a tip end surface of the shaft portion 52 of the pilot valve element 5.

When a current flows through the solenoid 7, the solenoid 7 drives the pilot valve element 5 such that the pilot valve element 5 opens the second pilot passage 63 against the biasing force of the biasing member 55. To be specific, the pilot valve element 5 also serves as a movable core driven by the solenoid 7. The solenoid 7 includes: a coil 71 wound around the second sliding chamber 20b; and a fixed magnetic pole 72 provided above the pilot valve element 5 and configured to attract the pilot valve element 5. The fixed magnetic pole 72 is also a part of the second main body 22 of the housing 2.

The shaft portion 52 of the pilot valve element 5 and the tubular portion 42 of the main valve element 4 are coupled to each other by a pin 8 extending in a horizontal direction orthogonal to the upward/downward direction. A transverse hole 56 into which the pin 8 is inserted is formed at the shaft portion 52 of the pilot valve element 5. A support hole 43 which supports both end portions of the pin 8 is formed at the tubular portion 42 of the main valve element 4. In the present embodiment, the pin 8 is fitted in the support hole 43 without any gap. When the pilot valve element 5 is in contact with the main valve element 4, a gap el between the pin 8 and the transverse hole 56 is formed under the pin 8. Therefore, the pilot valve element 5 can be separated from the main valve element 4 by the gap el (see FIG. 2). The transverse hole 56 may be a circular hole having a larger diameter than the pin 8 or may be an elongated hole having a width equal to the diameter of the pin 8 and extending in the upward/downward direction.

When the second pilot passage 63 is in a closed state, pressure Pr of the second pressure chamber 24 is equal to primary pressure P1 that is pressure of the primary passage 31. To move the pilot valve element 5 by the gap el, the solenoid 7 has attractive force Fc higher than force represented by Fs+Ap (P1−P2) where P2 denotes secondary pressure that is pressure of the secondary passage 33, Ap denotes an area of the second valve seat 45, and Fs denotes the biasing force of the biasing member 55.

When the second pilot passage 63 is opened by the pilot valve element 5, and the pressure of the second pressure chamber 24 becomes lower than the pressure of the first pressure chamber 32, the main valve element 4 is driven so as to open the secondary passage 33 by differential pressure between the first pressure chamber 32 and the second pressure chamber 24. Specifically, the first restrictor 62, the second restrictor 64, and areas A1 and Am are set so as to satisfy a formula "(P1−Pr)(A1−Am)>(Pr−P2)Am" where A1 denotes a cross-sectional area of the first sliding chamber 20a, and Am denotes an area of the first valve seat 25.

The sealing member 9 includes: a spiral ring 92 configured to slide on the peripheral surface of the first sliding chamber 20a; and an annular elastic body 91 configured to bias the spiral ring 92 in the radially outward direction. The elastic body 91 is a rubber ring having, for example, a substantially quadrangular shape or a circular section.

Figure 3A:
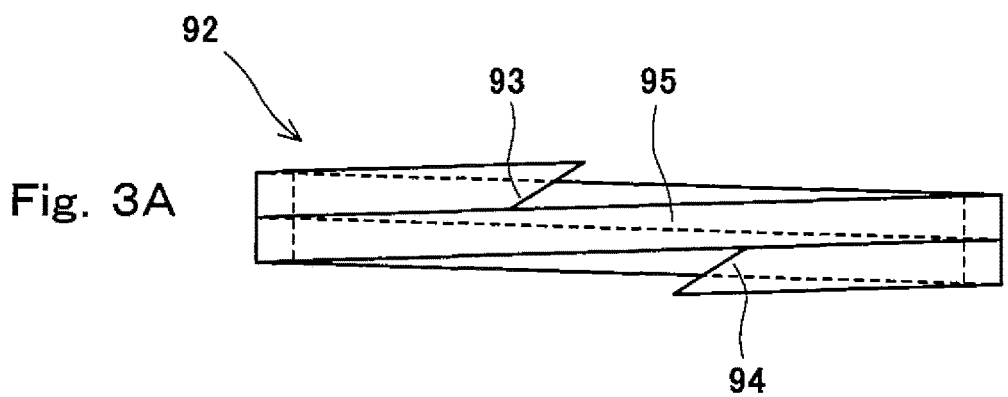
FIG. 3A is a side view of a spiral ring before the spiral ring is fitted into an annular groove of the main valve element.

As shown in FIG. 3A, the spiral ring 92 is formed by winding a single wire material such that at least both end portions 93 and 94 of the wire material overlap a circling portion 95 of the wire material when viewed from an axial direction of the spiral ring 92. To be specific, before the spiral ring 92 is fitted into the annular groove of the tubular portion 42 of the main valve element 4, in other words, when the spiral ring 92 is in a natural state, the spiral ring 92 has such a shape that the end portions 93 and 94 of the wire material project in the axial direction of the spiral ring 92. In the present embodiment, the wire material is wound substantially two times around the tubular portion 42. However, the wire material may be wound substantially 1.5 times or substantially three times. The spiral ring 92 is made of a relatively soft material (such as resin) so as to be crushable (deformable) in the radial direction and the axial direction. By crushing in the radial direction the spiral ring 92 made of the relatively soft material, the seal performance can be secured. Further, by crushing the spiral ring 92 in the axial direction, the spiral ring 92 can be deformed to have such a shape as to be fitted into the annular groove of the tubular portion 42 of the main valve element 4. Furthermore, by the spiral ring 92 made of resin, slidability of the spiral ring 92 can be made higher than that of a spiral ring made of rubber.

Figure 3B:
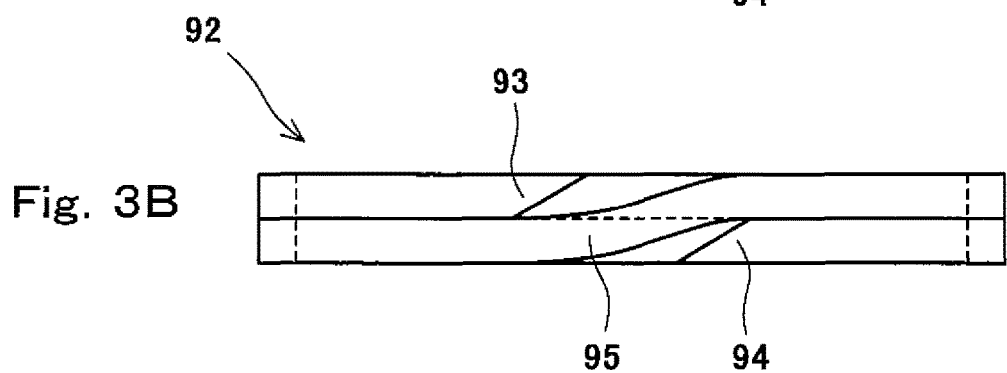
FIG. 3B is a side view of the spiral ring after the spiral ring is fitted into the annular groove of the main valve element.

Each of the end portions 93 and 94 of the wire material tapers such that a wedge-shaped gap is formed between the circling portion 95 and each of the end portions 93 and 94. In other words, the end portions 93 and 94 includes respective inclined surfaces inclined so as to oppose each other while sandwiching the circling portion 95 (in other words, so as to get close to the circling portion 95 from a tip end toward its vicinity position). Therefore, as shown in FIG. 3B, when fitting the spiral ring 92 into the annular groove of the tubular portion 42 of the main valve element 4, the circling portion 95 can be smoothly deformed between the end portions 93 and 94 of the wire material along the shapes of the end portions 93 and 94, and the spiral ring 92 can be easily made flat.

Next, operations of the valve device 1A will be explained. The following explanation starts from a state where the main valve element 4 is located at the closed position as shown in FIG. 1.

When a current does not flow through the solenoid 7, the pilot valve element 5 is pressed against the main valve element 4 by the biasing member 55, and therefore, the second pilot passage 63 is closed. To be specific, pressure of the second pilot passage 63 is equal to the secondary pressure P2, and pressure of the first pilot passage 61 and the second pressure chamber 24 is equal to the primary pressure P1. Therefore, the shaft portion 52 of the pilot valve element 5 is pressed against the second valve seat 45 by biasing force Fs of the biasing member 55 and pressing force (Ap(P1−P2)) corresponding to differential pressure between the second pressure chamber 24 and the second pilot passage 63. The shaft portion 41 of the main valve element 4 is pressed against the first valve seat 25 by the biasing force Fs of the biasing member 55 and pressing force (Am(P1−P2)) corresponding to differential pressure between the second pressure chamber 24 and the secondary passage 33.

When a current flows through the solenoid 7, first, the pilot valve element 5 moves upward by the gap e1 by the attractive force Fc of the solenoid 7. With this, the second pilot passage 63 is opened, and the fluid flows from the primary passage 31 through the first pilot passage 61, the second pressure chamber 24, and the second pilot passage 63 to the secondary passage 33. As a result, the pressure Pr of the second pressure chamber 24 decreases to pressure between the primary pressure P1 and the secondary pressure P2, and the main valve element 4 moves upward by the differential pressure between the first pressure chamber 32 and the second pressure chamber 24. With this, the secondary passage 33 is opened.

The main valve element 4 moves upward until the main valve element 4 contacts the stopper 23. In accordance with the upward movement of the main valve element 4, the pilot valve element 5 coupled to the main valve element 4 by the pin 8 also moves upward by the attractive force Fc of the solenoid 7.

In the present embodiment, a distance E from the pilot valve element 5 to the fixed magnetic pole 72 when the second pilot passage 63 and the secondary passage 33 are closed is set to be longer than a sum of the gap e1 which allows the pilot valve element 5 to be separated from the main valve element 4 and a distance e2 from the main valve element 4 to the stopper 23 (E>e1+e2). Therefore, even when the main valve element 4 contacts the stopper 23, a gap is secured between the pilot valve element 5 and the fixed magnetic pole 72 as shown in FIG. 2. In other words, the main valve element 4 can be pressed against the stopper 23 by the attractive force Fc of the solenoid 7. Therefore, even if the supply of the fluid is stopped at a downstream side of the valve device 1A, and the fluid does not flow through the main passage 3, the main valve element 4 can be restricted to the open position while a current flows through the solenoid 7. The gap e1 which allows the pilot valve element 5 to be separated from the main valve element 4 is much smaller than the distance e2 that is a stroke of the main valve element 4.

When the flow of the current through the solenoid 7 is cut, the pilot valve element 5 first closes the second pilot passage 63 by the biasing force Fs of the biasing member 55. With this, the pressure Pr and the pressure P1 become equal to each other, and the main valve element 4 moves from the open position to the closed position by the biasing force Fs of the biasing member 55 and the differential pressure between the second pressure chamber 24 and the secondary passage 33.

As explained above, according to the valve device 1A of the present embodiment, the main valve element 4 is driven in an open direction by the differential pressure between the first pressure chamber 32 and the second pressure chamber 24. Therefore, when the second pilot passage 63 is opened by the pilot valve element 5, the main valve element 4 instantly performs an open operation by a decrease in the pressure of the second pressure chamber 24. On this account, the valve device 1A has excellent responsiveness. In addition, the solenoid 7 for the pilot valve element 5 is only required to have the attractive force necessary to move the pilot valve element 5 by the gap e1 between the pin 8 and the pilot valve element 5. Therefore, the solenoid 7 can be reduced in size. Further, since the second pilot passage including the second restrictor 64 is formed at the main valve element 4, an area of the valve seat for the pilot valve element 5 can be reduced, and the open operation of the pilot valve element 5 can be performed by smaller driving power. Furthermore, since the main valve element 4 and the pilot valve element 5 are coupled to each other by the pin 8, the open state of the secondary passage 33 by the main valve element 4 can be maintained by utilizing the attractive force of the solenoid 7.

Figure 4:
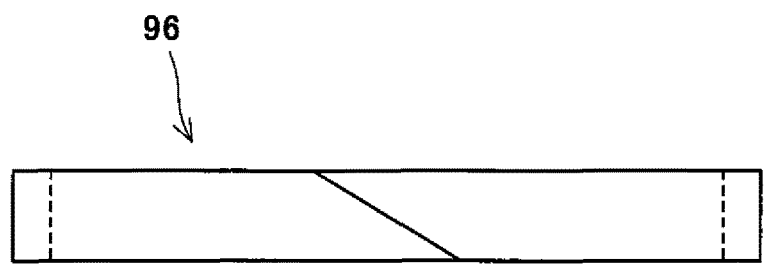
FIG. 4 is a side view of a bias cut type flat ring.

As the sealing member attached to the main valve element 4, it is possible to use a sealing member including: a bias cut type flat ring 96 configured to slide on the peripheral surface of the first sliding chamber 20a and having an oblique cut so as to be expandable when the flat ring 96 is attached as shown in FIG. 4; and an elastic body configured to bias the flat ring 96 in the radially outward direction. However, in this case, to stably generate differential pressure between the first pressure chamber 32 and the second pressure chamber 24, the size of the cut of the flat ring 96 after the flat ring 96 is attached needs to be managed strictly. On the other hand, according to the sealing member 9 including the spiral ring 92 as in the present embodiment, a length of an overlap where a part of the circling portion 95 and another part of the circling portion 95 overlap each other is relatively long. Therefore, adequate seal performance can be secured without strictly managing a gap between parts of the circling portion 95. On this account, unlike the flat ring 96, the management of the size of the cut of the flat ring 96 after the flat ring 96 is attached is unnecessary, and the manufacturing cost can be reduced.

Modification Example

In the above embodiment, the distance E from the pilot valve element 5 to the fixed magnetic pole 72 is set to be longer than the sum of the gap e1 which allows the pilot valve element 5 to be separated from the main valve element 4 and the distance e2 from the main valve element 4 to the stopper 23 (E>e1+e2). However, even in a case where the distance E is equal to or shorter than the sum of the gap e1 and the distance e2 (including a case where the distance e2 is equal to or longer than the distance E and a case where the stopper 23 is not provided), the pilot valve element 5 contacts the fixed magnetic pole 72 by the flow of the current through the solenoid 7, and the main valve element 4 coupled to the pilot valve element 5 by the pin 8 can be maintained at the open position. However, in this state, the position of the main valve element 4 may change by a slight gap between the pin 8 and the transverse hole 56. In contrast, when the distance E is longer than the sum of the gap e1 and the distance e2, the attractive force Fc of the solenoid 7 can be caused to act on the main valve element 4 located at the open position. With this, the position of the main valve element 4 can be prevented from changing. The present modification example is applicable to Embodiments 2 to 4 below.

The sealing member 9 does not necessarily have to include the elastic body 91 configured to bias the spiral ring 92 in the radially outward direction. For example, the elastic body 91 may be omitted in a case where the spiral ring 92 in a natural state is configured to have an outer diameter larger than the diameter of the peripheral surface of the first sliding chamber 20a. This modification example is also applicable to Embodiments 2 to 4 below.

Embodiment 2

Figure 5:
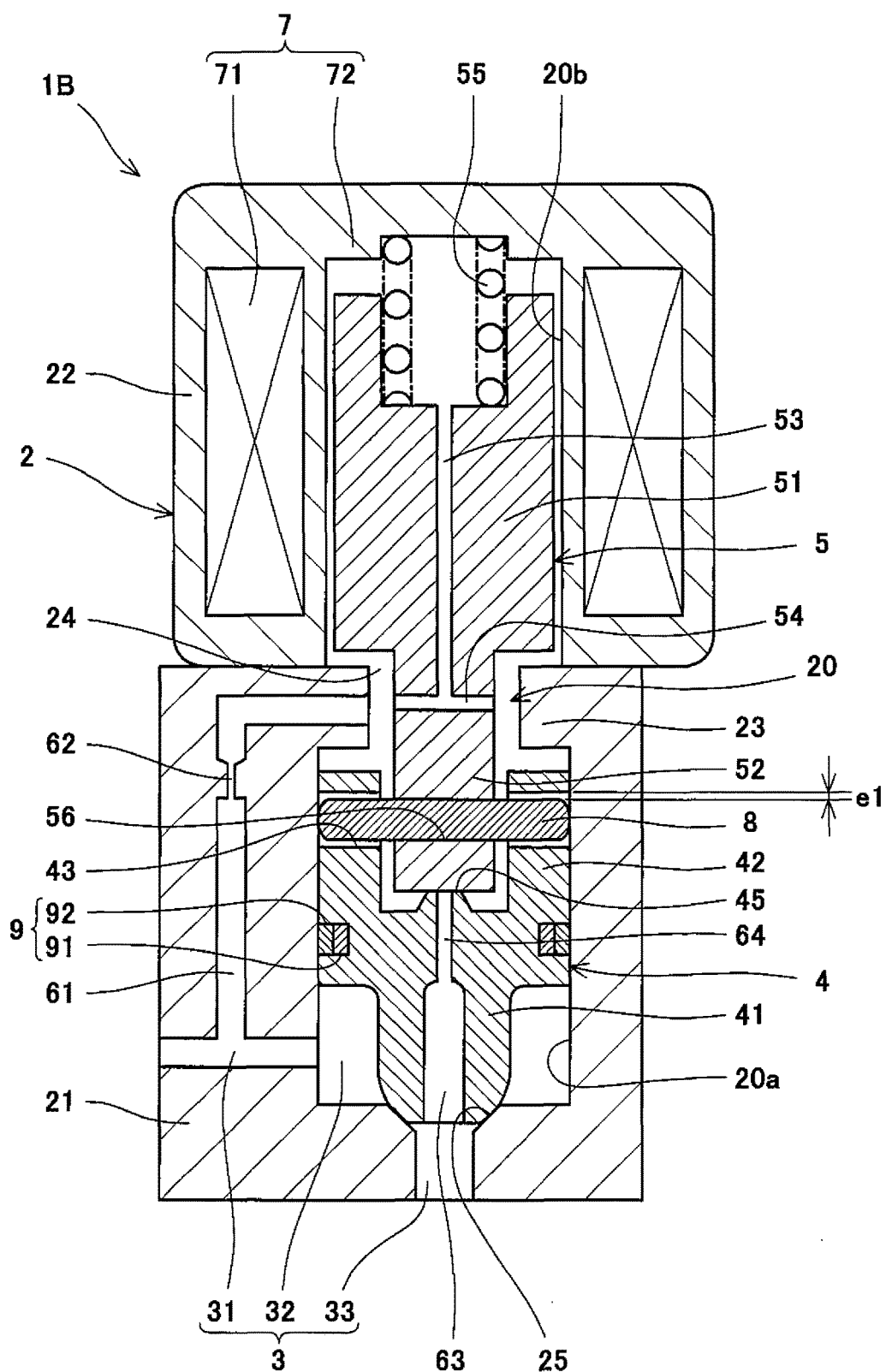
FIG. 5 is a schematic configuration diagram of the valve device according to Embodiment 2 of the present invention.

Next, a valve device 1B according to Embodiment 2 of the present invention will be explained in reference to FIG. 5. In the present embodiment and Embodiments 3 and 4 below, the same reference signs are used for the same components as in Embodiment 1, and a repetition of the same explanation is avoided.

In the present embodiment, the pin 8 is fitted in the transverse hole 56 of the pilot valve element 5 without any gap, and the gap e1 which allows the pilot valve element 5 to be separated from the main valve element 4 is formed between the support hole 43 of the main valve element 4 and the pin 8.

Embodiment 2 configured as above can obtain the same effects as Embodiment 1.

Embodiment 3

Figure 6:
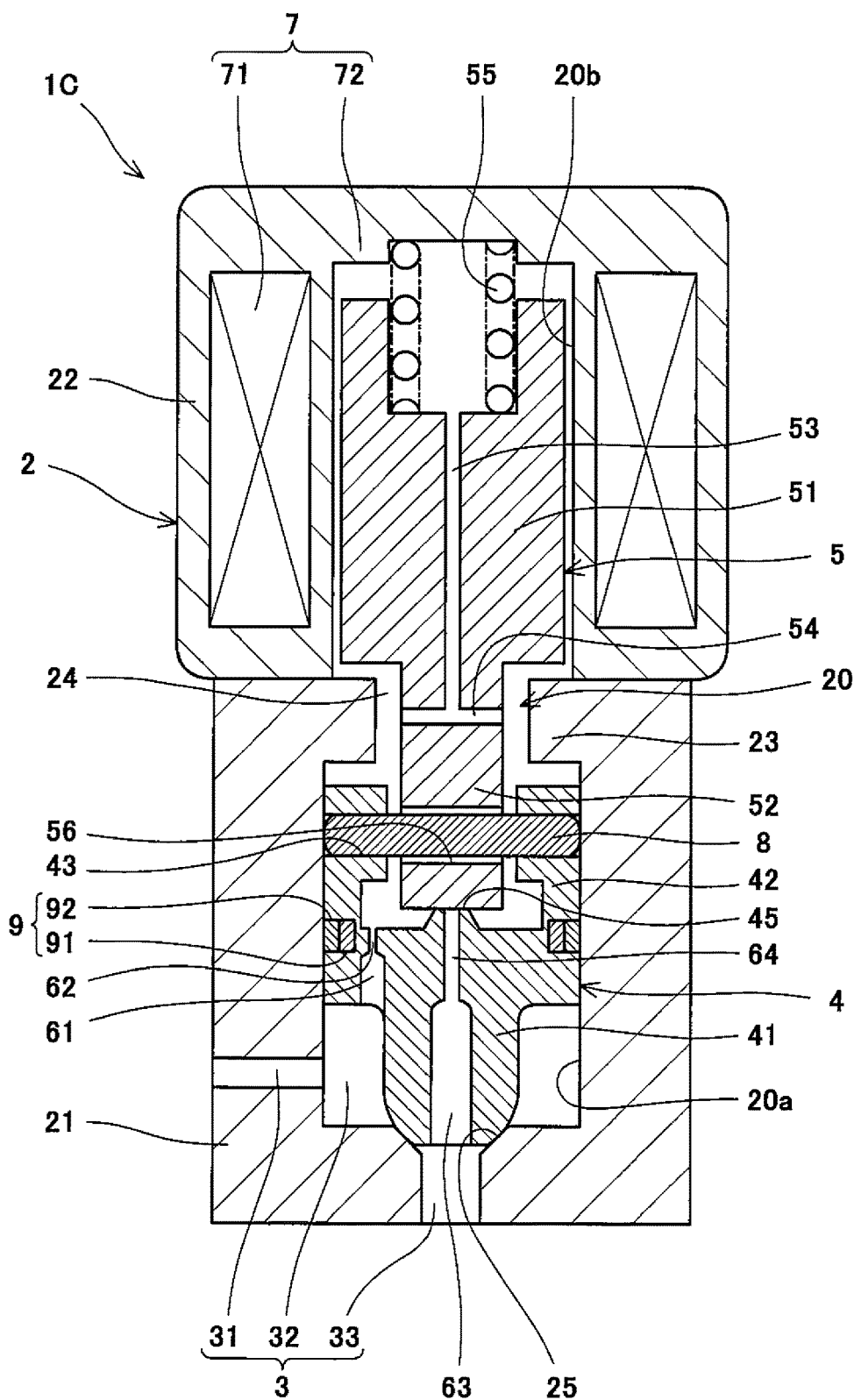
FIG. 6 is a schematic configuration diagram of the valve device according to Embodiment 3 of the present invention.
Figure 7:
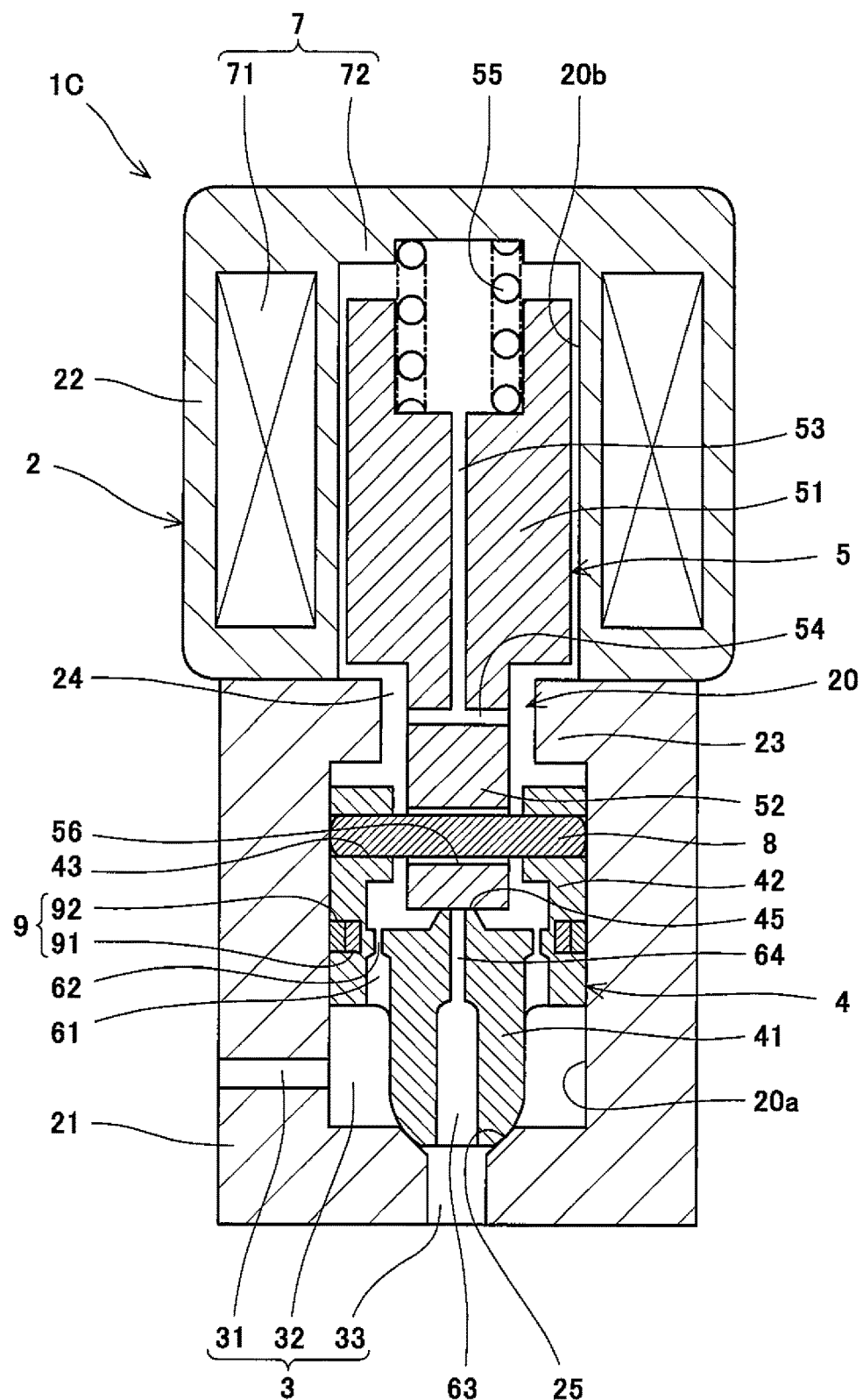
FIG. 7 is a schematic configuration diagram of the valve device according to Modification Example of Embodiment 3.

Next, a valve device 1C according to Embodiment 3 of the present invention will be explained in reference to FIG. 6. In the present embodiment, the first pilot passage 61 including the first restrictor 62 is formed at the main valve element 4, and the upstream end of the first pilot passage 61 indirectly communicates with the primary passage 31 through the first pressure chamber 32. As shown in FIG. 7, a plurality of first pilot passages 61 may be formed around the shaft portion 41 of the main valve element 4.

Embodiment 3 configured as above can obtain the same effects as Embodiment 1.

Embodiment 4

Figure 8:
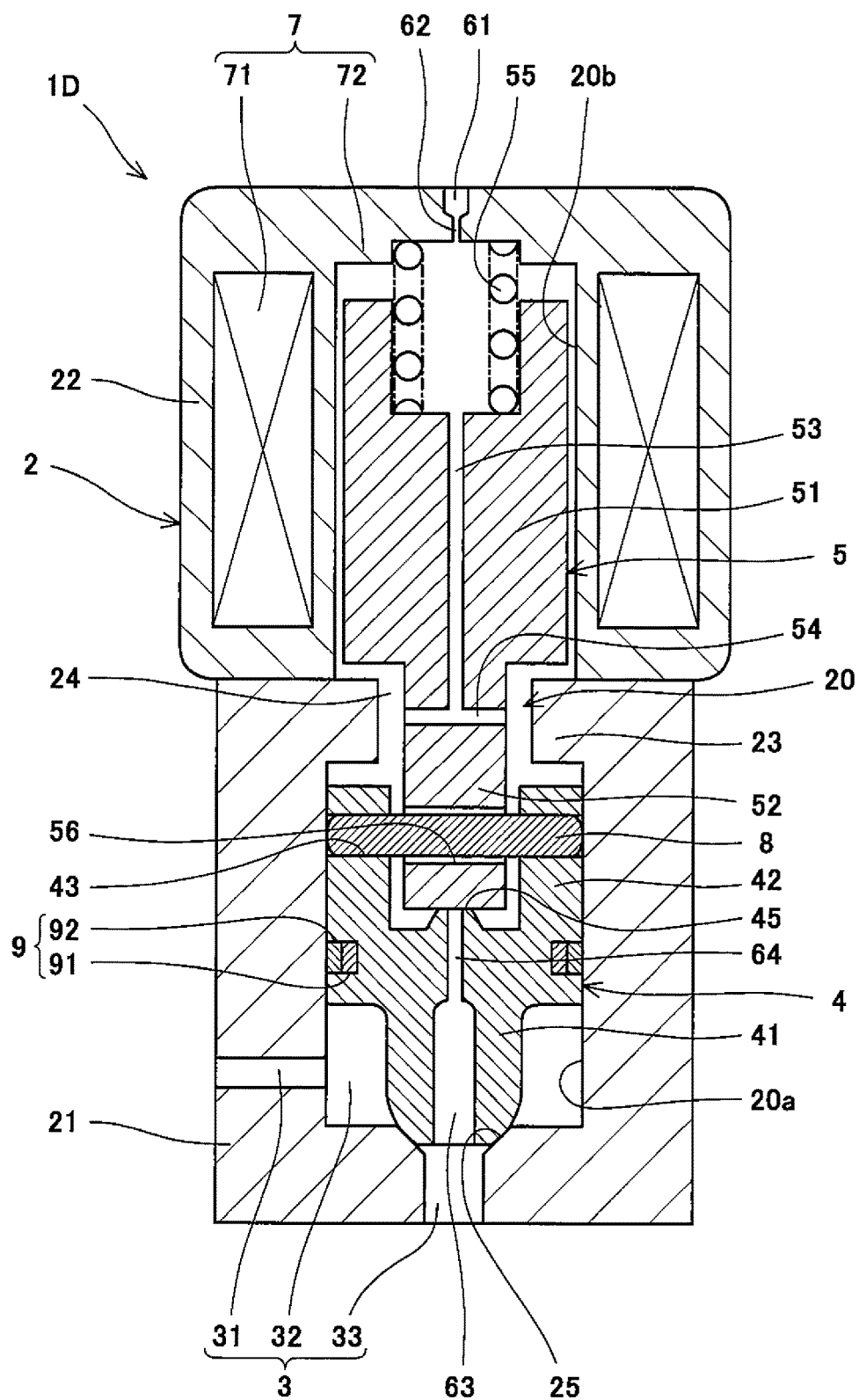
FIG. 8 is a schematic configuration diagram of the valve device according to Embodiment 4 of the present invention.

Next, a valve device 1D according to Embodiment 4 of the present invention will be explained in reference to FIG. 8. In the present embodiment, the first pilot passage 61 including the first restrictor 62 is formed at the fixed magnetic pole 72.

In the present embodiment, almost whole of the valve device 1D is assumed to be inserted into a gas tank (not shown). To be specific, the upstream end of the first pilot passage 61 indirectly communicates with the primary passage 31 through an internal space of the gas tank.

Embodiment 4 configured as above can obtain the same effects as Embodiment 1.

Other Embodiments

The present invention is not limited to Embodiments 1 to 4 described above, and various modifications may be made within the scope of the present invention.

Figure 9:
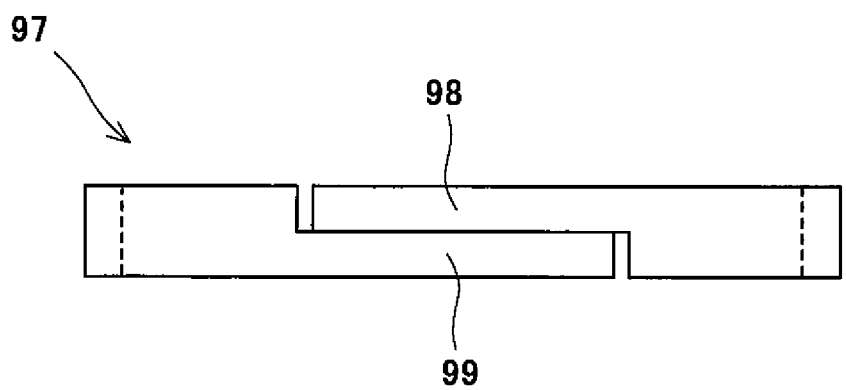
FIG. 9 is a side view of a flat ring which may be used instead of the spiral ring.
Figure 10:
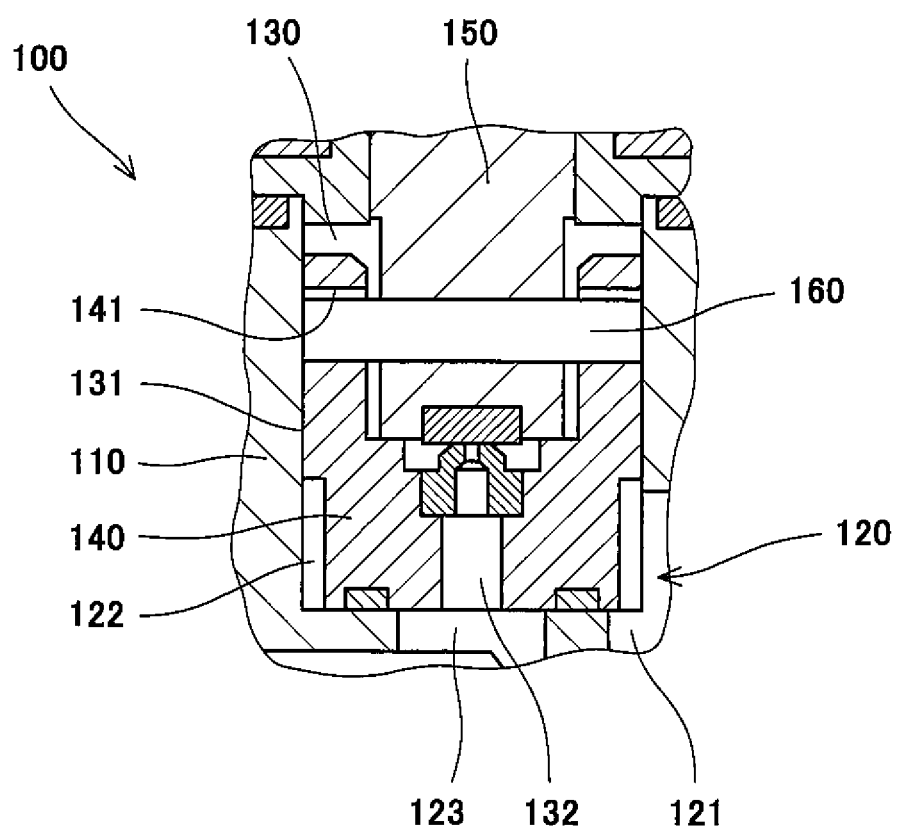
FIG. 10 is a cross-sectional view of a part of a conventional valve device.

For example, in Embodiments 1 to 4, instead of the spiral ring 92, a flat ring 97 configured to slide on the peripheral surface of the first sliding chamber 20a may be used as shown in FIG. 9. The flat ring 97 is configured such that both end portions 98 and 99, overlapping each other, of a wire material extending in a circumferential direction of the flat ring 97 have such step shapes as to be in surface contact with each other on a plane orthogonal to an axial direction of the flat ring 97. In other words, the end portions 98 and 99 of the wire material are mutually cut out so as to engage with each other. For example, the end portions 98 and 99 each having a height that is half a height of an intermediate portion of the wire material may extend in the circumferential direction of the flat ring 97. This configuration can also obtain the same effects as the above case where the spiral ring 92 is used.

Even in a case where the flat ring 97 is used, the flat ring 97 may be biased by the elastic body 91 in the radially outward direction, or the elastic body 91 may be omitted.

INDUSTRIAL APPLICABILITY

The present invention is widely applicable to valve devices for various uses.

REFERENCE SIGNS LIST 1A to 1E valve device
2 housing
20 valve element space
23 stopper
24 second pressure chamber
3 main passage
31 primary passage
32 first pressure chamber
33 secondary passage
4 main valve element
5 pilot valve element
55 biasing member
61 first pilot passage
62 first restrictor
63 second pilot passage
64 second restrictor
7 solenoid
8 pin
9 sealing member
91 elastic body
92 spiral ring
93, 94 end portion
95 circling portion
97 flat ring
98, 99 end portion
e1 gap

The invention claimed is:

1. A valve device comprising:
a housing including a primary passage, a secondary passage, and a valve element space between the primary passage and the secondary passage, the primary passage and the secondary passage constituting a main passage;
a main valve element provided in the housing so as to divide the valve element space into a first pressure chamber and a second pressure chamber, the main valve element being configured to open and close the secondary passage, the first pressure chamber communicating with the primary passage and the secondary passage;
a sealing member provided in an annular groove and configured to isolate the first pressure chamber and the second pressure chamber from each other, the annular groove being provided on the main valve element and covered with the housing;
a first pilot passage including one end directly or indirectly communicating with the primary passage, the other end communicating with the second pressure chamber, and a first restrictor;
a second pilot passage including a second restrictor and formed at the main valve element so as to extend from the second pressure chamber to the secondary passage;
a pilot valve element provided in the second pressure chamber and configured to open and close the second pilot passage;
a biasing member configured to press the pilot valve element against the main valve element;
a drive mechanism configured to, when a current flows through the drive mechanism, drive the pilot valve element such that the pilot valve element opens the second pilot passage against biasing force of the biasing member; and
a pin coupling the main valve element and the pilot valve element to each other, a gap which allows the pilot valve element to be separated from the main valve element being formed between the pin and the main valve element or between the pin and the pilot valve element, wherein:
when the second pilot passage is opened by the pilot valve element, and pressure of the second pressure chamber becomes lower than pressure of the first pressure chamber, the main valve element is driven so as to open the secondary passage by differential pressure between the first pressure chamber and the second pressure chamber; and the sealing member includes a spiral ring configured to slide on the housing.

2. The valve device according to claim 1, wherein:

the spiral ring is formed by winding a single wire material such that at least both end portions of the wire material overlap a circling portion of the wire material; and each of the end portions of the wire material tapers such that a wedge-shaped gap is formed between the circling portion and the end portion.

3. The valve device according to claim 1, wherein the sealing member includes an elastic body configured to bias the spiral ring in a radially outward direction.

4. The valve device according to claim 1, wherein:

the drive mechanism is a solenoid including a fixed magnetic pole configured to attract the pilot valve element;

the housing is provided with a stopper for the main valve element; and when the second pilot passage and the secondary passage are closed, a distance from the pilot valve element to the fixed magnetic pole is longer than a sum of a distance from the main valve element to the stopper and the gap.

5. The valve device according to claim 1, wherein the first pilot passage is formed at the housing or the main valve element.

6. A valve device comprising:

a housing including a primary passage, a secondary passage, and a valve element space between the primary passage and the secondary passage, the primary passage and the secondary passage constituting a main passage;

a main valve element provided in the housing so as to divide the valve element space into a first pressure chamber and a second pressure chamber, the main valve element being configured to open and close the secondary passage, the first pressure chamber communicating with the primary passage and the secondary passage;

a sealing member provided in an annular groove and configured to isolate the first pressure chamber and the second pressure chamber from each other, the annular groove being provided on the main valve element and covered with the housing;

a first pilot passage including one end directly or indirectly communicating with the primary passage, the other end communicating with the second pressure chamber, and a first restrictor;

a second pilot passage including a second restrictor and formed at the main valve element so as to extend from the second pressure chamber to the secondary passage;

a pilot valve element provided in the second pressure chamber and configured to open and close the second pilot passage;

a biasing member configured to press the pilot valve element against the main valve element;

a drive mechanism configured to, when a current flows through the drive mechanism, drive the pilot valve element such that the pilot valve element opens the second pilot passage against biasing force of the biasing member; and a pin coupling the main valve element and the pilot valve element to each other, a gap which allows the pilot valve element to be separated from the main valve element being formed between the pin and the main valve element or between the pin and the pilot valve element, wherein:

when the second pilot passage is opened by the pilot valve element, and pressure of the second pressure chamber becomes lower than pressure of the first pressure chamber, the main valve element is driven so as to open the secondary passage by differential pressure between the first pressure chamber and the second pressure chamber; and the sealing member includes a flat ring configured to slide on the housing and also configured such that both end portions, overlapping each other, of a wire material extending in a circumferential direction of the flat ring have such step shapes as to be in surface contact with each other on a plane orthogonal to an axial direction of the flat ring.

7. The valve device according to claim 6, wherein the sealing member includes an elastic body configured to bias the flat ring in a radially outward direction.

8. The valve device according to claim 6, wherein:

the drive mechanism is a solenoid including a fixed magnetic pole configured to attract the pilot valve element;

the housing is provided with a stopper for the main valve element; and when the second pilot passage and the secondary passage are closed, a distance from the pilot valve element to the fixed magnetic pole is longer than a sum of a distance from the main valve element to the stopper and the gap.

9. The valve device according to claim 6, wherein the first pilot passage is formed at the housing or the main valve element.

* * * * *